United States Patent [19]
Deets

[11] 4,065,428
[45] Dec. 27, 1977

[54] POLYMETHYLMETHACRYLATE BASED MOLDING COMPOSITIONS
[75] Inventor: Gary L. Deets, Springfield, Mass.
[73] Assignee: Monsanto Company, St. Louis, Mo.
[21] Appl. No.: 637,926
[22] Filed: Dec. 5, 1975
[51] Int. Cl.² .................. C08K 3/20; C08L 51/04
[52] U.S. Cl. .................. 260/45.75 B; 260/45.75 R; 260/45.75 D; 260/876 R; 260/DIG. 24
[58] Field of Search ............ 260/876 R, DIG. 24, 260/45.75 R, 45.75 B, 45.75 D, 890

[56] References Cited
U.S. PATENT DOCUMENTS

| 3,725,504 | 4/1973 | Owston | 260/876 R |
| 3,830,889 | 8/1974 | Deets et al. | 260/876 R |
| 3,903,037 | 9/1975 | Deets | 260/32.6 A |
| 3,929,722 | 12/1975 | Bak et al. | 260/42.47 |

FOREIGN PATENT DOCUMENTS

| 713,635 | 7/1965 | Canada | 400;260/89;876 R |

Primary Examiner—Murray Tillman
Assistant Examiner—Thurman K. Page
Attorney, Agent, or Firm—William J. Farrington; James C. Logomasini; Stanley M. Tarter

[57] ABSTRACT

Disclosed herein are polyblend molding compositions which comprise (A) a polymethylmethacrylate matrix polymer; (B) polychloroprene rubber which is grafted with methylmethacrylate; and (C) a metal oxide. Specimens molded from these polyblends have a UL-94 rating of at least V-1 and a smoke level of less than 300 $D_m$ Flaming using the NBS smoke test.

11 Claims, 1 Drawing Figure

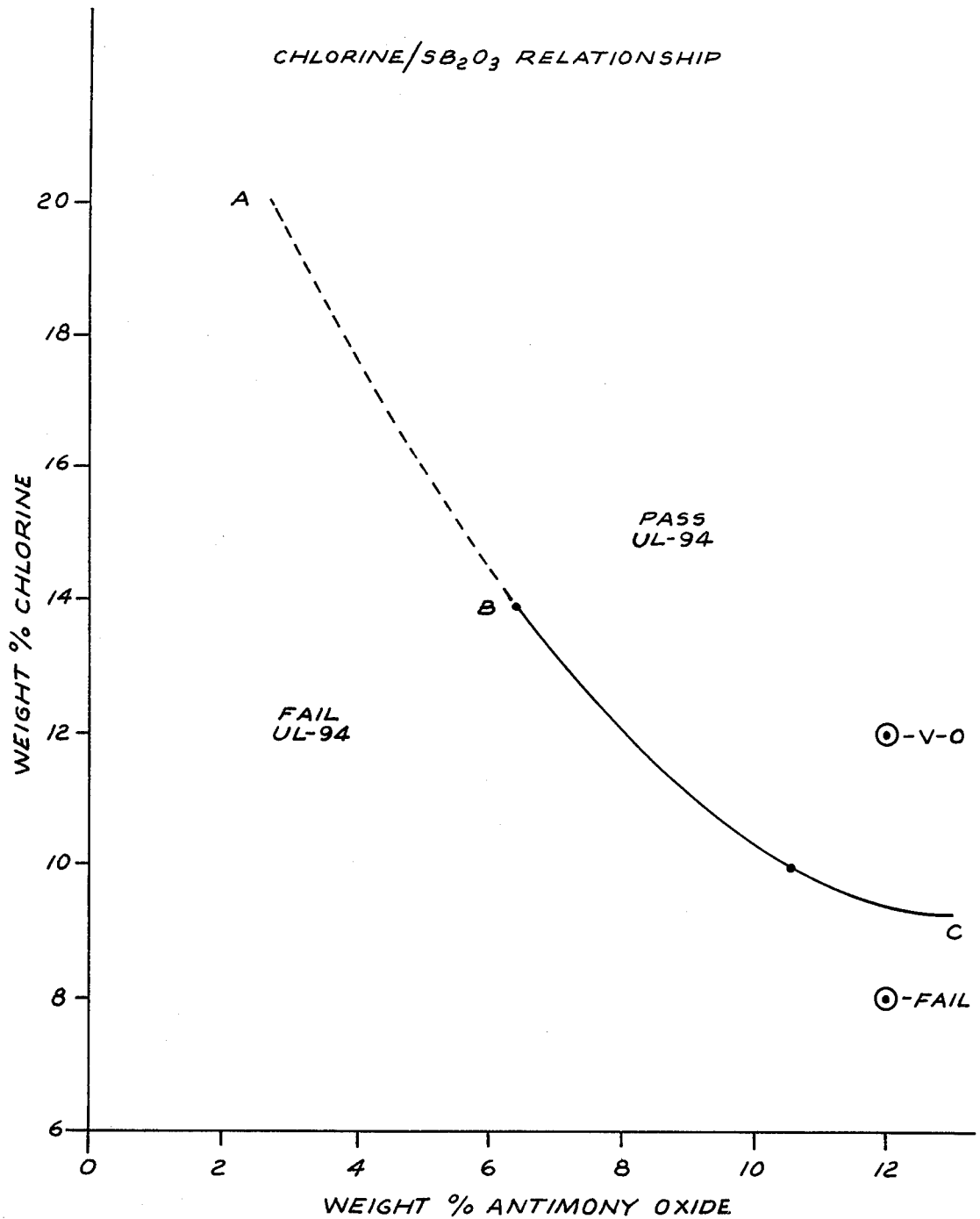

POLYMETHYLMETHACRYLATE BASED MOLDING COMPOSITIONS

BACKGROUND OF THE INVENTION

1. Field of the Invention

Disclosed herein are polyblend molding compositions which exhibit smoke evolution levels of less than 300 $D_m$ (Flaming) and UL-94 ratings of at least V-1. The polyblends comprise (A) a polymethylmethacrylate (PMMA) matrix polymer; (B) polychloroprene rubber which is grafted with methylmethacrylate (MMA); and (C) a metal oxide.

2. Description of the Prior Art

Polymethylmethacrylate (PMMA) based molding compositions are well known in the art. These materials are also known to burn readily and cleanly, i.e., with little evolution of smoke. When the PMMA is rubber-modified in order to obtain improved impact strength, the material still burns usually with increased amounts of smoke evolution due to the rubber component.

When the rubber-modified PMMA is formulated with flame retardant additives such as antimony oxide and decabromodiphenyl ether, the formulated material is slower to ignite and slower to burn than the control material which does not contain flame retardant additives. However, when the rubber-modified PMMA compositions which are formulated with the above fire retardant additives do burn, the smoke evolution increases.

A definite need exists in the art of rubber-modified PMMA based molding compositions which have better flame retardancy properties, i.e., slower to ignite and/or slower to burn and which exhibit levels of smoke evolution of less than 300 $D_m$ (Flaming).

SUMMARY OF THE INVENTION

The above needs in the prior art are met by the polyblend compositions of the present invention which comprises:

A. from 45 to 84 percent by weight based on the total weight of the polyblend of a polymethylmethacrylate (PMMA) matrix polymer; which optionally contains up to 40 percent by weight based on the weight of the matrix polymer of a comonomer, preferably a halogenated comonomer;

B. from 10 to 40 percent by weight based on the total weight of the polyblend of a polychloroprene rubber component which is grafted with from 10 to 100 parts of MMA per hundred parts of rubber; provided that the total amount of halogen in the polyblend due to the polychloroprene rubber component and the halogenated comonomer is at least 9.0 percent, preferably 10.0 percent, by weight;

C. from 6 to 15 percent by weight based on the total weight of the polyblend of a metal oxide.

DESCRIPTION OF THE DRAWING

FIG. 1 shows the relationship between the halogen content of the polyblend and the amount of antimony oxide required to obtain a rating of at least V-1 in the UL-94 test. The portion of the figure above the Curve ABC represents those compositions which will result in a V-1 or V-0 rating in the UL-94 test while that portion below the Curve ABC represents those compositions which will fail the UL-94 test. Generally at higher halogen levels less antimony oxide is required to obtain a V-1 rating. The broken line AB in FIG. I is an extrapolation.

DESCRIPTION OF THE PREFERRED EMBODIMENTS

THE MATRIX POLYMER

The matrix polymers used in the present invention are polymers of methylmethacrylate. These polymers are well known in the art and need no further explanation here. Up to 40 percent, preferably up to 30 percent, of the MMA used to prepare the matrix polymers may be replaced with a suitable copolymerizable monomer. Examples of such monomers include styrene type monomers such as styrene, alpha-methyl styrene, halostyrene, etc., nitrile monomers such as acrylonitrile, methacrylonitrile, etc., haloacrylates and methacrylates such as chloroethylacrylate, bromomethylacrylate, tribromoneopentyl acrylate, methacrylate, bromophenyl acrylates and methacrylates containing 1 to 5 bromine atoms, etc., vinyl phosphates such as diethyl vinyl phosphonate, bis(2-chloroethyl)-vinyl phosphonate, etc. The halogen and phosphorous containing comonomers are preferred, with tribromophenyl acrylate, tribromophenyl methacrylate, tribromoneopentyl acrylate, tribromoneopentyl methacrylate and bis(2-chloroethyl)-vinyl phosphonate being most preferred because of the tendency of these monomers to increase the fire retardancy of the polyblend. The preferred amount of halogenated comonomers is in the range of from 5 to 35 percent by weight, more preferably from 10 to 35 percent by weight, based on the total weight of the polymethylmethacrylate matrix polymer.

The total amount of the methylmethacrylate polymer used in the polyblends of the present invention is in the range of 45 to 84 percent by weight based on the total weight of the polyblend. This includes both that which is grafted onto the rubber component and that present as matrix polymer.

THE CHLOROPRENE RUBBER COMPONENT

The polychloroprene rubber component used in the present invention is polychloroprene or a copolymer of chloroprene and at least one other monomer such as butadiene, acrylonitrile, methacrylonitrile, styrene, ring substituted halostyrene, alpha-halostyrene, ring substituted alkystyrene, alpha-alkyl-styrene, vinyl chloride, etc. The amount of comonomer used is in the range of 0 to 20 percent based on the weight of polychloroprene rubber copolymer.

Chloroprene rubbers are commercially available as solid rubbers, rubber latices (also referred to as emulsions) and solutions. The preferred polychloroprene rubbers used in the present invention are those in solid form or in latex form. The chloroprene rubber used is crosslinked either before of during processing in order to maintain its particulate nature. The most preferred chloroprene rubbers used in latex or emulsion graft systems are crosslinked to a medium to high gel content and have a Mooney viscosity above at least about 200 (MS 2½ min. 212° F.). These rubber latices are sold by E. I. duPont de Nemours and Company as Neoprene Latices, e.g., Neoprene 842A. Neoprene Latices available from the E. I. duPont de Nemours and Company, Wilmington, Del. are described in the reference "Neoprene Latex," by J. C. Carl, published by duPont in 1962. In general, the Neoprene Latices have a rubber solids content of about 34 to 60 percent, a pH of about 9 to 13, latex specific gravity of about 1.10 to 1.15, rubber specific gravity of 1.23 to 1.42, latex viscosity of 16 to 400 cps (Brookfield viscosity) and the latices are stabilized by anionic or cationic emulsifiers. The rubber particle size distribution of such latices can be varied so as to give the selected weight average particle size range desired and disclosed in this invention. Other polychloroprene latices are also commercially available from the Petro-Tex Chemical Corporation of Houston, Tex.

Ungrafted polychloroprene rubber can be used in the present invention. However, polychloroprene rubber which has been grafted with a polymer composition similar to that used for the matrix polymer is preferred. The grafted polychloroprene rubber provides better impact strength and fire retardancy because the graft improves the degree of dispersion of the rubber in the polyblend.

The solid chloroprene rubbers are conventionally grafted by dissolving or dispersing the rubber in the monomers to be grafted onto the rubber.

The chloroprene rubbers in latex or emulsion form are readily grafted by dispersing the MMA monomer and any halogenated comonomers in the latex or emulsion and then grafting the monomer onto the rubber using conventional polymerization methods. As the polymerization progresses a polymer of methylmethacrylate is also formed in the reacting mixture. Such polyblends have much greater impact strength than the matrix polymers alone.

The percent of monomer grafted onto the polychloroprene rubber is a controlled amount and can be varied from about 10 to 100 percent depending on the weight average particle size of the rubber and the properties desired. The percent graft is defined as the weight percent of monomers grafted onto the rubber particle, based on the weight of the rubber, e.g., 100 grams of rubber grafted with 100 grams of monomer has 100 percent of grafted monomers.

The weight average particle size of the rubber is selected to provide a balance of good physical properties such as impact and gloss. The polychloroprene rubber latices used have a rubber particle size (before grafting) of from about 0.01 to 0.60 micron with about 0.05 to 0.35 micron being most preferred. The most preferred size is 0.05 to 0.35 micron in order to give the polyblend desirable impact strength and high gloss. These rubber particles (0.05 to 0.35 micron) are grafted in a preferred range of 10 to 100 percent by weight with 45 to 65 percent being most preferred to insure compatability and good gloss.

The type and amount of monomers described above in reference to the preparation of the matrix polymer are used in the grafting polymerization of the polychloroprene rubber. It is desirable to use halogenated comonomers in the graft polymerization of the rubbers when these are used to prepare the matrix polymer.

The polyblends of the present invention require a halogen content of at least 10 percent by weight, based on the weight of the polyblend in order to qualify for a V-1 fire retardancy rating. In order to obtain this amount of halogen, the polyblends of the present invention contain from about 25 to 40 percent by weight, of a polychloroprene rubber component (calculated as ungrafted rubber) based on the total weight of the polyblend. When polychloroprene rubber copolymers are used, the weight of the polychloroprene rubber copolymer is selected to provide 10 to 40 percent by weight of chloroprene rubber units in the polyblend. The above values correspond to about 11 to 80 percent by weight of grafted polychloroprene rubber considering that the graft level can be from about 10 percent to 100 percent by weight of the polychloroprene rubber. When using halogenated comonomers the amount of polychloroprene rubber in the blend can be reduced to as low as 10 percent by weight providing that the total amount of halogen in the polyblend due to the chloroprene and the halogenated comonomer is at least 9 percent, preferably 10 percent, by weight.

Small amounts, i.e., up to 10 percent by weight, preferably up to 5 percent by weight of the polychloroprene rubber component may be replaced with other rubbers conventionally used to reinforce polymeric materials. Examples of these rubbers include polybutadiene, polyisoprene, rubbery polyacrylates and ethylene vinyl acetate copolymers, ethylene-propylene rubbers, etc. Other suitable rubbers will be obvious to those skilled in the art upon reading the present specification. When substituting these rubbers for the polychloroprene rubber component used in the present invention, care should be taken with the type and amount of rubber so as not to unduly increase the flammability and/or the smoke evolution properties of the polyblends of the present invention.

THE METAL OXIDES

The present invention contains from 6 to 15 percent by weight, based on the weight of the polyblend, of at least one metal oxide. Preferred additives are metal oxides such as $Sb_2O_3$, $Bi_2O_3$, $MoO_3$, $SnO_2$, $WO_3$, and the like. The preferred additive is antimony oxide. As FIG. I illustrates, less antimony oxide is required with increasing amounts of chlorine in order to pass the UL-94 test.

TEST PROCEDURES

Underwriter's Laboratory UL-94 Test (1)

Fire retardant properties are measured using the "Test for Flammability For Plastic Materials - UL-94," September 17, 1973. The test is carried out on test specimens 6 × ½ × ⅛ inch. When other sample thicknesses are used the stated thickness is given.

1. The numerical flame spread ratings reported herein are not intended to reflect hazards presented by the presently claimed polyblends or any other materials under actual fire conditions.

The test specimen is supported from the upper end, with longest dimension vertical, by a clamp on a ring stand so that the lower end of the specimen is ⅜ inch above the top of the burner tube. The burner is then placed remote from sample, ignited, and adjusted to produce a blue flame ¾ inch in height.

The test flame is placed centrally under the lower end of the test specimen and allowed to remain for 10 seconds. The test flame is then withdrawn, and the duration of flaming or glowing combustion of the specimen noted. If flaming or glowing combustion of the specimen ceases within 30 seconds after removal of the test flame, the test flame is again placed under the specimen for 10 seconds immediately after flaming combustion of the specimen stops. The test flame is again withdrawn, and the duration of flaming combustion of the specimen noted.

If the specimen drops flaming particles or droplets while burning in this test, these drippings shall be allowed to fall onto a horizontal layer of cotton fibers (untreated surgical cotton) placed one foot below the test specimen. Significantly flaming particles are considered to be those capable of igniting the cotton fibers.

The duration of flaming or glowing combustion of vertical specimens after application of the test flame, average of five specimens (10 flame applications) shall not exceed 25 seconds (maximum not more than 30 seconds), and the portion of the specimen outside the clamp shall not be completely burned in the test.

Materials which comply with the above requirements and do not drip any flaming particles or droplets during the burning test will classify as V-1 according to the nomenclature used in the UL-94 test.

Materials which comply with the above requirements, but drip flaming particles or droplets which ignite cotton fibers will classify as V-2 according to the nomenclature used in the UL-94 test.

Class V-0 is given to materials wherein the duration of flaming averages less than 5 seconds under the conditions above with no ignition burning more than 10 seconds.

SMOKE EVOLUTION TESTS

The method used for measuring smoke evolution is that described in D. Gross, J. J. Loftus, and A. F. Robertson, "Method for Measuring Smoke from Burning Materials," Symposium on Fire Test Methods — Restraint and Smoke 1966, ASTM STP 422, Am. Soc. Testing Mats., 1967, p. 166.

EXAMPLE 1

This example illustrates the preparation of the polymethylmethacrylate (PMMA) matrix used in the present invention.

The PMMA used in the working examples is prepared using the following charge:
100 parts MMA monomer
0.6 part n-dodecyl mercaptan
0.1 part $K_2S_2O_8$ (initiator)
0.04 part $NaHSO_3$ (initiator)
.00033 part $Fe_2(SO_4)_3$
1 part Dowfax 2A (emulsifier)
1 part Dupanol ME (emulsifier)
Water to provide 35 percent of polymeric solids The water, emulsifiers (as 10 percent solutions), and $Fe_2(SO_4)_3$ are added initially to the reaction vessel and heated to 60° C. under nitrogen. The monomer, n-dodecyl mercaptan and initiator solutions are added continuously over a four hour period. The bath is then held at 70° C. for 2 hours at the end of the addition period. Conversion of monomer to polymer is 98 percent.

EXAMPLE 2

This example illustrates the grafting of polychloroprene with MMA monomers. A polychloroprene latex (Latex 842A from duPont), having an average particle size of about 0.12 micron, is grafted with methylmethacrylate using the following charge:
100 parts polychloroprene in latex form
1 part Dowfax 2A (emulsifier)
1 part Dupanol ME (emulsifier)
100 parts MMA monomer
1 part $K_2S_2O_8$ (initiator)
0.5 part n-dodecyl mercaptan
Water to provide 35 percent of polymeric solids The water and emulsifiers (as 10 percent aqueous solutions) are added to the polychloroprene latex which is then heated to 85° C. under a nitrogen blanket. The monomer, n-dodecyl mercaptan and $K_2S_2O_8$ (4 percent aqueous solution) are added continuously to the latex over a four hour period. At the end of the addition period the batch is held at 85° C. for two hours. The resulting conversion of monomer to polymer is in the range of from 94 to 98 percent. This includes the polymer which is grafted onto the rubber and that which polymerized to form a matrix polymer. The amount of grafting of PMMA onto the polychloroprene rubber is about 50 percent by weight.

EXAMPLE 3

Example 2 is repeated here except that a polybutadiene latex is used in place of the polychloroprene latex used in Example 2.

EXAMPLE 4

Example 2 is repeated here except that a polybutyl acrylate latex is used in place of the polychloroprene latex used in Example 2.

EXAMPLES 5 to 9

Various polyblends are prepared using the polymeric products from Examples, 1, 3 and 4 above. The PMMA matrix polymer from Example 1, the grafted rubbers from Examples 3 and 4 and antimony oxide and/or decabromodiphenyl ether are blended by melt processing and then formed into test samples by compression molding.

The samples are then tested for flame retardancy and smoke evolution, according to the procedures outlined above. The results of these tests are tabulated in Table I below.

TABLE I

| | SUMMARY OF EXAMPLES 5 to 9(1) | | | | |
|---|---|---|---|---|---|
| Example | % $Sb_2O_3$ | % DBDPE(2) | % Rubber(3) | UL-94 | $D_m$(Flaming) |
| 5 (Control) | — | — | — | Fail | 40 |
| 6 " | — | — | 15 PBD | Fail | 180 |
| 7 " | — | — | 15 PBA | Fail | 60 |
| 8 " | 7 | 15 | 15 PBD | V-1 | 380 |
| 9 " | 9 | 19 | 15 PBA | V-1 | 380 |

(1)Example 5 is the PMMA from Example 1 without rubber or fire retardant additives.
(2)DBDPE is decabromodiphenyl ether.
(3)Percent by weight of rubber in polyblend. The weight given is that of the rubber component before grafting.
PBD is polybutadiene of Example 3.
PBA is polybutyl acrylate of Example 4.

Examples 5 to 7 indicate that PMMA with and without rubber modification burns quite readily. The data further indicate that these materials are fairly clean burning exhibiting low levels of smoke. Examples 8 and 9 indicate that when the rubber modified PMMA is compounded with antimony oxide and decabromodiphenyl ether and the samples achieve a degree of fire retardancy (V-1 rating) with the smoke levels increasing markedly. The total halogen content in these examples is 12.5 and 15.8 percent by weight, respectively.

EXAMPLES 10 to 17

In these examples the PMMA of Example 1 is blended with the grafted chloroprene rubber of Example 2 and antimony oxide. The resulting polyblends are then tested for flame retardancy and smoke evolution according to the procedures outlined above. The results of these tests are tabulated in Table II below.

TABLE II
SUMMARY OF EXAMPLES 10 to 16

| Example | % $Sb_2O_3$ | % P.C.(1) | Rubber Component(2) | UL-94 | $D_m$(Flaming) |
|---|---|---|---|---|---|
| 10 | none | none(0) | none | Fail | 40 |
| 11 | 10.5 | 25 (10) | 70/30 | V-1 | 250 |
| 12 | 10.5 | 25 (10) | 100 | V-1 | 235 |
| 13 | 9 | 20 (8) | 100 | Fail | 180 |
| 14 | 12 | 30 (12) | 100 | V-0 | 250 |
| 15 | 10.5 | 25 (10) | 90/10 | V-1 | 255 |
| 16 | 10.5 | 25 (10) | 50/50 | V-1 | 290 |

(1)Percent by weight of polychloroprene rubber in polyblend calculated as weight of ungrafted rubber. Numbers in parenthesis are total halogen content of polyblend.
(2)Examples 11, 15 and 16 use a blend of grafted/ungrafted polychloroprene. The ratio given is by weight based on the total weight of the rubber component.

Referring to Table II above, Examples 10 and 13 illustrate the necessity for using at least 25 percent of chloroprene rubber in polyblends which contain no additional halogen sources. A comparison of Examples 11 to 16 with Examples 8 and 9 show the lower smoke levels that are obtained with the fire retardant polymer systems of the present invention.

EXAMPLES 17 to 23

These examples illustrate the use of certain comonomers in the preparation of the methylmethacrylate matrix polymers used in the present invention. The matrix polymers used in Examples 17 to 23 are prepared according to the general procedures used in Example 1 above to obtain a copolymer containing 90 percent by weight MMA and 10 percent by weight of the comonomer.

The polymers are then blended with the grafted polychloroprene rubber prepared in Example 2 above. The resulting polyblends contain 20 percent by weight of polychloroprene rubber and 9 percent by weight of antimony oxide both based on the total weight of the polyblend. Example 23 uses a matrix polymer which contains 70 percent by weight of MMA and 30 percent by weight of tribromoneopentyl methacrylate. This polymer is blended with 10 percent by weight of polychloroprene rubber and 6 percent by weight of antimony oxide both based on the total weight of the polyblend. The matrix compositions and test results, on these examples are tabulated in Table III below.

TABLE III
SUMMARY OF EXAMPLES 17 to 23

| Ex. | Comonomer (1) | UL-94 | $D_m$(Flaming) |
|---|---|---|---|
| 17 | chlorostyrene (9.3) | V-1 | 248 |
| 18 | styrene (8) | Fail | 238 |
| 19 | bromostyrene (10.2) | V-1 | 254 |
| 20 | chloroethylmethacrylate (9.2) | Fail | 226 |
| 21 | bis(2-chloroethyl)-vinyl phosphonate (9.6) | V-0 | 200 |
| 22 | diethylvinyl phosphonate (8) | Fail | 235 |
| 23 | tribromoneopentyl methacrylate (13.2) | V-0 | 277 |

(1)Numbers in parenthesis are the total amounts of halogen in the polyblend.

Referring to Table II above, Examples 18 and 20, which have a chlorine content of 8 percent and 9.2 percent, respectively, fail the UL-94 test. Example 17, which uses a chlorostyrene comonomer, has a V-1 rating at a halogen content of 9.3 percent by weight. These examples indicate the desirability of having a halogen content of at least 10 percent by weight at an $Sb_2O_3$ level of 9 percent by weight in order to pass the UL-94 test. Example 21 illustrates the use of a bis(2-chloroethyl)-vinyl phosphonate comonomer which contains both chlorine and phosphorus atoms. This material exhibits a V-0 rating and a smoke level of 200 despite the fact that the halogen level is less than 10 percent by weight. In this regard, it should be noted that the phosphorus is believed to be contributing to the flame retardancy. Example 23 illustrates that a V-0 rating may be obtained when using only 10 percent by weight of polychloroprene rubber and 6 percent by weight of antimony oxide when using a highly halogenated comonomer, e.g., tribromoneopentyl methacrylate which provides a polyblend having a total halogen content of 13.2 percent by weight.

The polyblends of the present invention are useful for preparing a wide variety of molded objects such as radio and television cabinets, appliance housings, parts and components for vehicles, furniture and other related items.

Polyblends of the present invention may be further modified with conventional additives and adjuvants such as fillers, plasticizers, U.V. stabilizers, heat stabilizers, antioxidants, etc. Care should be taken when formulating or compounding the polyblends of the present invention so as not to adversely effect the flammability and/or smoke evolution properties of the polyblends of the present invention.

What is claimed is:
1. A polyblend molding composition comprising:
  A. from 45 to 84 percent by weight bsed on the total weight of the polyblend of a polymethylmethacrylate polymer which contains from 0 to 40 percent by weight based on the weight of the matrix polymer of a halogenated comonomer;
  B. from 10 to 40 percent by weight based on the total weight of the polyblend of a polychloroprene rubber component, calculated as ungrafted rubber, which is grafted with from 10 to 100 parts, per hundred parts of rubber, of polymethylmethacrylate which contains from 0 to 40 percent by weight, based on the weight of the polymethylmethacrylate graft copolymer of a halogenated comonomer; and
  C. from 6 to 15 percent by weight based on the total weight of the polyblend of a flame retardant additive;

provided that the total amount of halogen in the polyblend due to the polychloroprene rubber component and the halogenated comonomer is at least 9.0 percent by weight; and wherein the polyblend exhibits a UL-94 rating of at least V-1 and smoke evolution of less than 300 $D_m$ (Flaming).

2. A polyblend as in claim 1 wherein the total amount of halogen in the polyblend is at least 10% by weight.

3. A polyblend as in claim 2 wherein the fire retardant additive is antimony oxide.

4. A polyblend as in claim 3 wherein the matrix polymer contains from 5 to 35 percent by weight of a halogenated comonomer.

5. A polyblend as in claim 4 wherein the halogenated comonomer is selected from the group consisting of chlorostyrene, bromostyrene, bromoneopentyl acrylates, bromoneopentyl methacrylates, bromophenylacrylates, bromophenylmethacrylates, and bis(2-chloroethyl)-vinyl phosphate.

6. A polyblend as in claim 2 which further contains up to 5 percent by weight of an additional rubber component.

7. A polyblend molding composition comprising:
   A. from 45 to 84 percent by weight based on the total weight of the polyblend of a polymethylmethacrylate polymer which contains from 10 to 35 percent by weight based on the weight of the matrix polymer of a halogenated comonomer;
   B. from 10 to 40 percent by weight based on the total weight of the polyblend of a polychloroprene rubber component, calculated as ungrafted rubber, which is grafted with from 10 to 100 parts, per hundred parts of rubber, of polymethylmethacrylate which contains from 10 to 35 percent by weight, based on the weight of the polymethylmethacrylate graft copolymer of a brominated comonomer; and
   C. from 6 to 15 percent by weight based on the total weight of the polyblend of antimony oxide;
provided that the total amount of halogen in the polyblend due to the polychloroprene rubber component and the halogenated comonomer is at least 10 percent by weight; and wherein the polyblend exhibits a UL-94 rating of at least V-1 and smoke evolution of less than 300 $D_m$ (Flaming).

8. A polyblend as in claim 7 wherein the brominated comonomer is selected from the group consisting of bromostyrene, bromoneopentyl acrylates, bromoneopentyl methacrylates, bromophenylacrylates and bromophenylmethacrylates.

9. A polyblend as in claim 8 wherein the brominated monomer is selected from the group consisting of tribromoneopentyl acrylate, tribromoneopentyl methacrylate, tribromophenyl acrylate and tribromophenyl methacrylate.

10. A polyblend molding composition comprising:
    A. from 45 to 84 percent by weight based on the total weight of the polyblend of a polymethylmethacrylate polymer which contains from 10 to 35 percent by weight based on the weight of the matrix polymer of a halogenated comonomer selected from the group consisting of chlorostyrene, bromostyrene, tribromoneopentyl acrylate, tribromoneopentyl methacrylate, tribromophenyl acrylate and tribromophenyl methacrylate;
    B. from 10 to 40 percent by weight based on the total weight of the polyblend of a polychloroprene rubber component, calculated as ungrafted rubber, which is grafted with from 10 to 100 parts, per hundred parts of rubber, of polymethylmethacrylate which contains from 10 to 35 percent by weight, based on the weight of the polymethylmethacrylate graft copolymer of a halogenated comonomer selected from the group consisting of chlorostyrene, bromostyrene, tribromoneopentyl acrylate, tribromoneopentyl methacrylate,, tribromophenyl acrylate and tribromophenyl methacrylate;
    C. from 6 to 15 percent by weight based on the total weight of the polyblend of antimony oxide;
provided that the total amount of halogen in the polyblend due to the polychloroprene rubber component and the halogenated comonomer is at least 10 percent by weight; and wherein the polyblend exhibits a UL-94 rating of at least V-1 and smoke evolution of less than 300 $D_m$ (Flaming).

11. A polyblend as in claim 10 wherein the halogenated monomers used in components (A) and (B) are selected from the group consisting of tribromoneopentyl acrylate, tribromoneopentyl methacrylate, tribromophenyl acrylate and tribromophenyl methacrylate.

* * * * *